United States Patent
Guri et al.

(10) Patent No.: US 11,645,383 B2
(45) Date of Patent: May 9, 2023

(54) EARLY RUNTIME DETECTION AND PREVENTION OF RANSOMWARE

(71) Applicant: Morphisec Information Security 2014 Ltd., Beer-Sheva (IL)

(72) Inventors: Mordechai Guri, Nof Ayalon (IL); Ronen Yehoshua, Matan (IL); Michael Gorelik, Brookline, MA (US)

(73) Assignee: MORPHISEC INFORMATION SECURITY 2014 LTD., Beer Sheva (IL)

(*) Notice: Subject to any disclaimer, the term of this patent is extended or adjusted under 35 U.S.C. 154(b) by 736 days.

(21) Appl. No.: 16/476,939

(22) PCT Filed: Dec. 28, 2017

(86) PCT No.: PCT/IB2017/058485
§ 371 (c)(1),
(2) Date: Jul. 10, 2019

(87) PCT Pub. No.: WO2018/130904
PCT Pub. Date: Jul. 19, 2018

(65) Prior Publication Data
US 2019/0332766 A1    Oct. 31, 2019

Related U.S. Application Data

(60) Provisional application No. 62/445,015, filed on Jan. 11, 2017.

(51) Int. Cl.
*G06F 21/54*    (2013.01)
*G06N 20/00*    (2019.01)
(Continued)

(52) U.S. Cl.
CPC ............ *G06F 21/54* (2013.01); *G06F 21/554* (2013.01); *G06F 21/564* (2013.01);
(Continued)

(58) Field of Classification Search
CPC ...... G06F 21/54; G06F 21/554; G06F 21/564; G06F 21/566; G06F 2221/2123; G06N 20/00
See application file for complete search history.

(56) References Cited

U.S. PATENT DOCUMENTS 8,479,276 B1    7/2013   Vaystikh et al.
8,549,643 B1    10/2013  Shou et al.
(Continued)

FOREIGN PATENT DOCUMENTS

EP    3568791 A1     11/2019
WO    2018130904 A1   7/2018

OTHER PUBLICATIONS

Feng et al., "Poster: A New Approach to Detecting Ransomware with Deception", 2017, pp. 1-2, 38th IEEE Symposium on Security and Privacy. (Year: 2017).*

(Continued)

*Primary Examiner* — Hee K Song
(74) *Attorney, Agent, or Firm* — Weaver IP L.L.C.

(57) ABSTRACT

Various automated techniques are described herein for the runtime detection/neutralization of malware executing on a computing device. The foregoing is achievable during a relatively early phase, for example, before the malware manages to encrypt any of the user's files. For instance, a malicious process detector may create decoy file(s) in a directory. The decoy file(s) may have attributes that cause such file(s) to reside at the beginning and/or end of a file list. By doing so, a malicious process targeting files in the directory will attempt to encrypt the decoy file(s) before any other file. The detector monitors operations to the decoy file(s) to determine whether a malicious process is active on the user's computing device. In response to determining that a malicious process is active, the malicious process detector (Continued)

takes protective measure(s) to neutralize the malicious process.

20 Claims, 5 Drawing Sheets

(51) Int. Cl.
  *G06F 21/55* (2013.01)
  *G06F 21/56* (2013.01)

(52) U.S. Cl.
  CPC ............ *G06F 21/566* (2013.01); *G06N 20/00* (2019.01); *G06F 2221/2123* (2013.01)

(56) References Cited

U.S. PATENT DOCUMENTS

| | | | |
|---|---|---|---|
| 10,169,586 B2* | 1/2019 | Maciejak | G06F 21/566 |
| 10,289,845 B2* | 5/2019 | Charters | G06F 21/568 |
| 10,409,986 B1* | 9/2019 | Natanzon | G06F 12/1408 |
| 10,503,897 B1* | 12/2019 | Striem-Amit | G06F 21/552 |
| 10,609,066 B1* | 3/2020 | Nossik | H04L 63/1408 |
| 10,733,290 B2* | 8/2020 | Berler | G06F 21/562 |
| 10,769,278 B2* | 9/2020 | Chelarescu | G06F 21/566 |
| 10,917,416 B2* | 2/2021 | Chelarescu | G06F 21/565 |
| 2016/0180087 A1 | 6/2016 | Bean et al. | |
| 2016/0323316 A1* | 11/2016 | Kolton | H04L 63/1491 |
| 2017/0134423 A1 | 5/2017 | Sysman et al. | |
| 2018/0121650 A1* | 5/2018 | Brown | G06F 21/565 |
| 2018/0157834 A1* | 6/2018 | Continella | G06F 21/554 |
| 2018/0189490 A1* | 7/2018 | Maciejak | G06F 21/566 |

OTHER PUBLICATIONS

Continella et al. "ShieldFS: A Self-healing, Ransomware-aware Filesystem", ACSAX 2016, December, pp. 1-12. (Year: 2016).*
Lee et al., "How to Make Efficient Decoy Files for Ransomware Detection?", School of Computer Science and Engineering, Sep. 2017, pp. 208-212.
Moore, Chris "Detecting Ransomware with Honeypot Techniques", Computing and Media Services, 2016, pp. 1-5.
Whitham, Ben "Canary Files: Generating Fake Files to Detect Critical Data Loss from Complex Computer Networks", University of New South Wales, 2013, pp. 170-179.
Continella, et al., "ShieldFS: A Self-Healing, Ransomware-Aware Filesystem", DEIB, Politecnico di Milano, Milan, Italy, Dec. 5-9, 2016, pp. 336-347.
International Search Report and Written Opinion received for PCT Patent Application No. PCT/IB2017/058485, dated Mar. 5, 2018, 11 pages.
Office Action received for Israel Patent Application No. 267854, dated Dec. 20, 2020, 7 pages (4 pages of English Translation and 3 pages of Official Copy).
International Preliminary Report on Patentability received for PCT Patent Application No. PCT/IB2017/058485, dated Jul. 25, 2019, 7 pages.

* cited by examiner

EARLY RUNTIME DETECTION AND PREVENTION OF RANSOMWARE

CROSS REFERENCE TO RELATED APPLICATION

This application is a U.S. national phase application of PCT/IB2017/058485, filed on Dec. 28, 2017, which claims priority to U.S. Provisional Application Ser. No. 62/445,015, filed Jan. 11, 2017 (both entitled "Early Runtime Detection and Prevention of Ransomware"), the entireties of which are incorporated by reference herein.

BACKGROUND

Technical Field

Embodiments described herein generally relate to detecting and/or neutralizing malware or other security threats on computer systems, such as ransomware.

Description of Related Art

In recent years, ransomware has been recognized as one of the most serious cyber threats. Ransomware typically encrypts important documents on a target computer. In order to decrypt the documents, the user must pay a considerable ransom. In cases in which the targeted files have not been backed-up, security experts often advise the victim to pay the ransom because there is no effective way to restore the encrypted data.

BRIEF SUMMARY

Methods, systems, and apparatuses are described for detecting and/or neutralizing malware or other security threats on computer systems, such as ransomware, substantially as shown in and/or described herein in connection with at least one of the figures, as set forth more completely in the claims.

BRIEF DESCRIPTION OF THE DRAWINGS

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
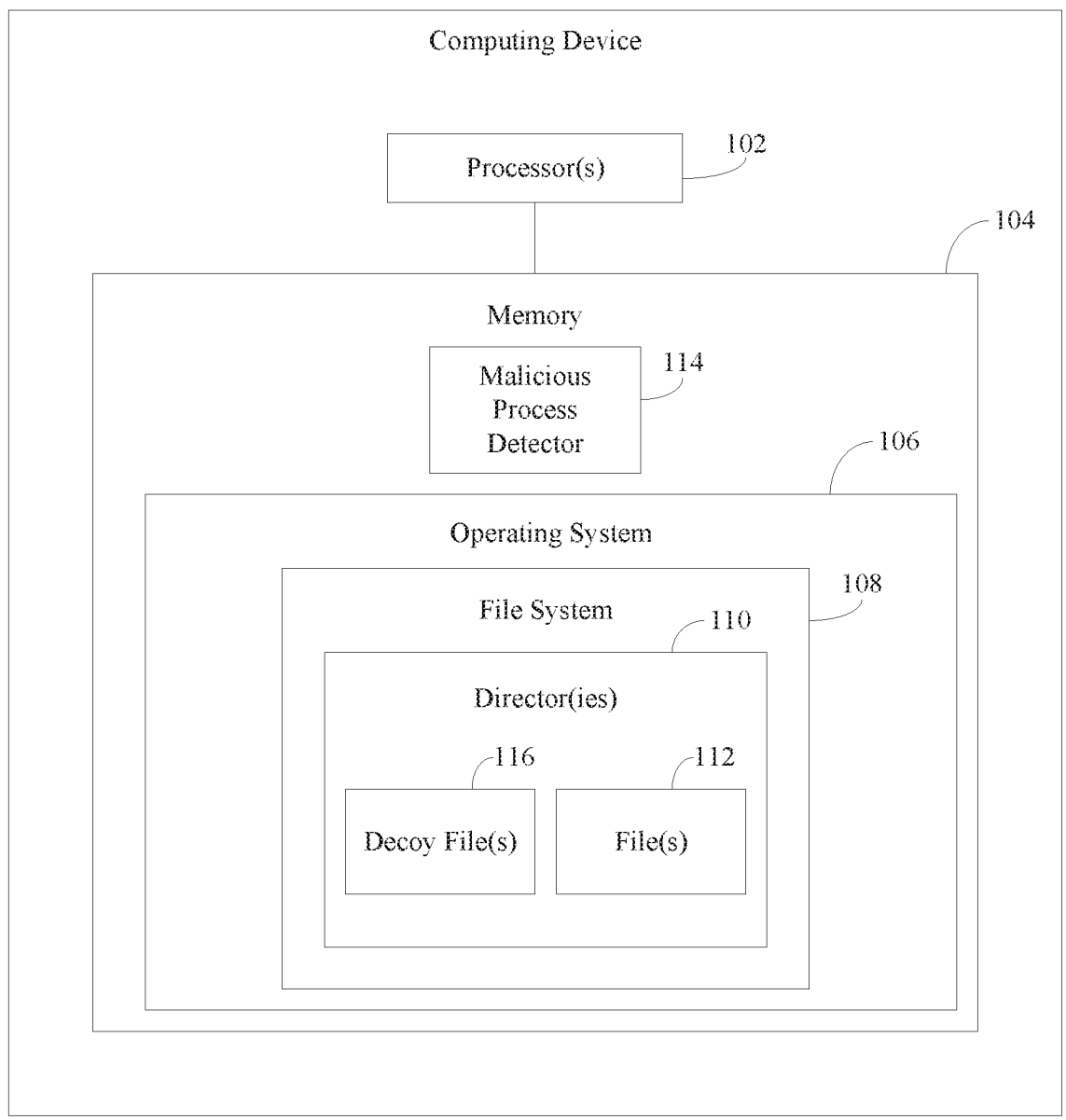
FIG. 1 depicts a block diagram of an example computing device in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Numerous exemplary embodiments are now described. The section/subsection headings utilized herein are not intended to be limiting. Embodiments are described throughout this document, and any type of embodiment may be included under any section/subsection. Furthermore, it is contemplated that the disclosed embodiments may be combined with each other in any manner.

II. Example Embodiments

Conventional anti-malware programs do not offer an effective systematic method for handling ransomware. Prior techniques have tried to address the problem by various back-up methods and static signature-based detection of ransomware files by antivirus utilities or similar facilities. However, such techniques still result in at least a portion of the user's documents to be encrypted. Further steps should be taken to detect ransomware before any user documents are encrypted.

In particular, a method for malware prevention performed by a computing device is described herein. In accordance with the method, one or more decoy files in a file directory that stores one or more other files are created. A determination is made that one or more file access operations are being performed with respect to at least one of the one or more decoy files. The one or more file access operations are analyzed to determine whether the one or more file access operations originate from a malicious process. In response to determining that the one or more file access operations originate from the malicious process, an action is performed to neutralize the malicious process.

In accordance with one or more embodiments, the performing step comprises at least one of terminating the malicious process, suspending the malicious process, performing a backup of the one or more other files stored in the file directory, checking an integrity of the one or more other files, activating an anti-virus program, recording in an event log an event that indicates that the malicious process performed the one or more file access operations to the one or more decoy files, or prompting a user of the computing device to indicate an operation to perform.

In accordance with one or more embodiments, the method further comprises periodically modifying one or more attributes of the one or more decoy files such that a sorting operation performed on the files stored in the directory causes the one or more decoy files to be listed before the other one or more files in a list generated by the sorting operation.

In accordance with one or more embodiments, the one or more attributes comprise at least one of a file name, a file size, a creation, or a modification date.

In accordance with one or more embodiments, the analyzing step comprises identifying a pattern associated with the one or more file access operations that are performed with respect to the one or more decoy files and providing the pattern as an input to a machine-learning-based algorithm that outputs an indication of whether the pattern is a legal file access pattern or an illegal file access pattern, the machine-learning-based algorithm being trained on observed file access patterns for the one or more other files.

In accordance with one or more embodiments, the machine-learning based algorithm outputs a probability that the pattern is a legal file access pattern and the analyzing step further comprises comparing the probability to a threshold.

In accordance with one or more embodiments, the analyzing step comprises identifying a pattern associated with the one or more file access operations that are performed with respect to the one or more decoy files and applying one or more rules to the pattern to determine whether the one or more file access operations originate from the malicious process.

In accordance with one or more embodiments, the pattern associated with the one or more file access operations comprises a read operation to the decoy file or to a portion thereof and a write operation to the same decoy file or the same portion thereof.

A system is also described herein. The system includes one or more processors and a memory coupled to the one or more processors, the memory storing instructions, which, when executed by one or more processors, cause the one or more processors to perform operations. In accordance with the operations, one or more decoy files in a file directory that stores one or more other files are created. A determination is made that one or more file access operations are being performed with respect to at least one of the one or more decoy files. The one or more file access operations are analyzed to determine whether the one or more file access operations originate from a malicious process. In response to determining that the one or more file access operations originate from the malicious process, an action is performed to neutralize the malicious process.

In accordance with one or more embodiments, the performing step comprises at least one of terminating the malicious process, suspending the malicious process, performing a backup of the one or more other files stored in the file directory, checking an integrity of the one or more other files, activating an anti-virus program, recording in an event log an event that indicates that the malicious process performed the one or more file access operations to the one or more decoy files, or prompting a user of the computing device to indicate an operation to perform.

In accordance with one or more embodiments, the operations further comprise periodically modifying one or more attributes of the one or more decoy files such that a sorting operation performed on the files stored in the directory causes the one or more decoy files to be listed before the other one or more files in a list generated by the sorting operation.

In accordance with one or more embodiments, the one or more attributes comprise at least one of a file name, a file size, a creation, or a modification date.

In accordance with one or more embodiments, the analyzing step comprises identifying a pattern associated with the one or more file access operations that are performed with respect to the one or more decoy files and providing the pattern as an input to a machine-learning-based algorithm that outputs an indication of whether the pattern is a legal file access pattern or an illegal file access pattern, the machine-learning-based algorithm being trained on observed file access patterns for the one or more other files.

In accordance with one or more embodiments, the machine-learning based algorithm outputs a probability that the pattern is a legal file access pattern and the analyzing step further comprises comparing the probability to a threshold.

In accordance with one or more embodiments, the analyzing step comprises identifying a pattern associated with the one or more file access operations that are performed with respect to the one or more decoy files and applying one or more rules to the pattern to determine whether the one or more file access operations originate from the malicious process.

In accordance with one or more embodiments, the pattern associated with the one or more file access operations comprises a read operation to the decoy file or to a portion thereof and a write operation to the same decoy file or the same portion thereof.

A computer-readable storage medium having program instructions recorded thereon that, when executed by a processing device, perform a method for detecting a malicious process is further described herein. In accordance with the method, one or more decoy files in a file directory that stores one or more other files are created. A determination is made that one or more file access operations are being performed with respect to at least one of the one or more decoy files. The one or more file access operations are analyzed to determine whether the one or more file access operations originate from a malicious process. In response to determining that the one or more file access operations originate from the malicious process, an action is performed to neutralize the malicious process.

In accordance with one or more embodiments, the performing step comprises at least one of terminating the malicious process, suspending the malicious process, performing a backup of the one or more other files stored in the file directory, checking an integrity of the one or more other files, activating an anti-virus program, recording in an event log an event that indicates that the malicious process performed the one or more file access operations to the one or more decoy files, or prompting a user of the computing device to indicate an operation to perform.

In accordance with one or more embodiments, the method further comprises periodically modifying one or more attributes of the one or more decoy files such that a sorting operation performed on the files stored in the directory causes the one or more decoy files to be listed before the other one or more files in a list generated by the sorting operation.

In accordance with one or more embodiments, the one or more attributes comprise at least one of a file name, a file size, a creation, or a modification date.

III. Example Systems and Methods for Detecting and/or Neutralizing Ransomware Various automated techniques are described herein for the runtime detection and/or neutralization of malware (e.g., ransomware) executing on a computing device. The foregoing may be achieved during a relatively early phase (e.g., soon after the malware begins executing), for example, before the malware manages to encrypt any of the user's files. For instance, a malicious process detector may create one or more decoy file(s) in a directory. The decoy file(s) may have attributes that cause such file(s) to reside at the beginning and/or end of a file list. By doing so, a malware process targeting files in the directory will attempt to encrypt the decoy file(s) before any other file. The malicious process detector monitors operations to the decoy file(s) to determine whether a malicious process is active on the user's computing device. In response to determining that a malicious process is active, the malicious process detector takes one or more protective measures to neutralize the malicious process. By having the malicious process intentionally target the decoy file(s) first, the risk of having important user files compromised before detection of the malware process is greatly reduced.

For the sake of brevity, embodiments described herein are described in terms of the Microsoft Windows® Operating System (OS), published by Microsoft Corporation of Redmond, Wash. However, as should be clear to any person skilled in the art, this is just one possible embodiment. Similar embodiments may protect practically all kinds of modern operating systems, including LINUX® and other UNIX® variants, against a very wide array of malicious-code attacks, whether remote or local.

For instance, FIG. 1 shows a block diagram of an example computing device 100, according to an example embodiment. Computing device 100 may be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a smart phone (e.g., an Apple iPhone, a Google Android™ phone, a Microsoft Windows® phone, etc.), or other type of computing device. However, these examples are not intended to be limiting and computing device 100 may include other types of devices other than those listed herein.

As further shown in FIG. 1, computing device 100 comprises one or more processor(s) 102 and a memory 104. Processor(s) 102 are intended to represent one or more microprocessors, each of which may have one or more central processing units (CPUs) or microprocessor cores. Processor(s) 102 comprise hardware components that operate in a well-known manner to execute computer programs (also referred to herein as computer program logic). The execution of such computer programs causes processor(s) 102 to perform operations including operations that will be described herein.

Memory 104 comprises one or more computer-readable memory devices that operate to store computer programs and data. Memory 104 may be implemented using any of a wide variety of hardware-based, volatile computer-readable memory devices including, but not limited to, random access memory (RAM) devices and/or non-volatile computer-readable memory devices, including but not limited to, read-only memory (ROM) devices, solid state drives, hard disk drives, magnetic storage media such as magnetic disks and associated drives, optical storage media such as optical disks and associated drives, and flash memory devices such as USB flash drives. Processor(s) 102 are connected to memory 104 via one or more suitable interfaces.

As shown further shown in FIG. 1, memory 104 stores an operating system 106. Operating system 106 may manage one or more hardware components (e.g., processor(s) 102, memory 104, etc.) and/or software components installed and/or executing on computing device 100. Example hardware components of computing device 100 are described in detail below in reference to FIG. 7.

Operating system 106 may comprise a file system 108 that is operable to name, store, access and organize files. In accordance with an embodiment, file system 108 stores files, directories and information needed to locate and access such items. File system 108 may be capable of storing files to a variety of physical media (e.g., memory 104), including but not limited to one or more hard disk drives, solid state drives, optical discs, magnetic tapes, flash memory devices, or the like. For example, as shown in FIG. 1, file system 108 may comprise one or more file directories 110, each of which may comprise one or more sub-directories. Each of such director(ies) 110 may store one or more files 112 (e.g., documents, spreadsheets, pictures, images, etc.). File(s) 112 may be generated by a user, downloaded from the Internet, or copied from external storage (e.g., DVD/CD, USB thumb drive, etc.). Examples of file system 108, include but are not limited to, a File Allocation Table (FAT)-based file system, a New Technology File System (NTFS), etc.

Computing device 100 is configured to detect and/or neutralize malicious processes from compromising (e.g., encrypting) such file(s) 112. For example, as shown in FIG. 1, computing device 100 may include a malicious process detector 114, which executes in memory 104. Malicious process detector 114 may be configured to detect the presence of malware executing on computing device 100. Malware may comprise ransomware or any other malicious process that aims to corrupt, encrypt and/or compromise the user's data stored on computing device 100. Malware may also comprise computer viruses, worms, Trojan horses, and/or the like.

Malicious process detector 114 may create one or more decoy files 116 in one or more of director(ies) 110. Examples of such directories include, but are not limited to, a default documents storage directory of operating system 106, directories that contain user, documents, spreadsheets, pictures, images, or any other directory maintained by file system 108. It is noted in addition to or in lieu of file(s) 112 and decoy file(s) 116 being stored in director(ies) 110, file(s) 112 and decoy file(s) 116 may be stored in any suitable storage location and may be stored accordance with any suitable organization.

When a computing process (or "process") reads a directory, a file list may be returned to the process that includes each of the files included therein. The file list may be sortable by any given attribute of files included therein. Such attributes include, but are not limited to, the file name, the file size, the creation date, the modification date, etc. Malicious process detector 114 may define such attribute(s) of decoy file(s) 116 in a manner that makes decoy file(s) 116 reside at the beginning and/or the end of the file list when traversed by a process (e.g., a malicious process, such as ransomware) that reads director(ies) 110. By doing so, the likelihood that the malicious process accesses decoy document(s) 116 before file(s) 112 is greatly increased, and the risk of having file(s) 112 compromised before detection of the malicious process is greatly reduced.

Malicious process detector 114 is configured to monitor operations (e.g., read operations, write operations, etc.) to decoy file(s) 116 and determine the likelihood that such operations are typical of a malicious process. In response to determining that the operations are typical of a malicious process, malicious process detector 114 may perform an action to neutralize the malicious process. Neutralization of the malicious process may include steps to terminate or suspend the malicious process, steps to mitigate the effects of the malicious process, and/or steps to facilitate the termination, suspension and/or mitigation of the malicious process (such as detecting the malicious process). For example, malicious process detector 114 may cause operating system 106 to terminate the malicious process, suspend the malicious process, perform backup of file(s) 112 stored on computing device 100 (e.g., file(s) 112, check the integrity of file(s) 112, activate an anti-virus program or other security mechanisms, write event logs, prompt the user to indicate what operation to perform, etc.

Figure 2:
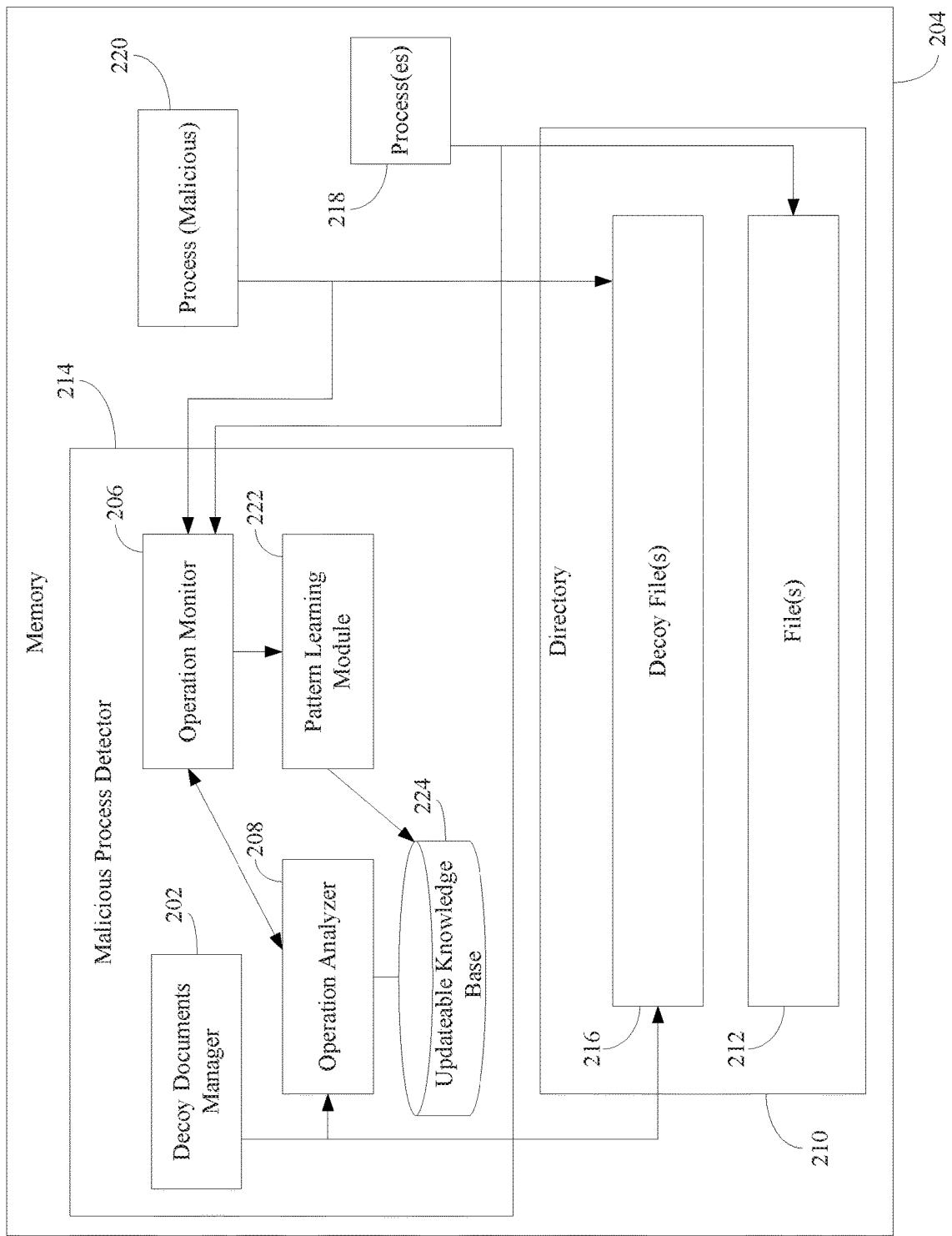
FIG. 2 depicts a block diagram of an example malicious process detector stored in a memory in accordance with an embodiment.

FIG. 2 shows a block diagram of an example malicious process detector 214, according to an example embodiment. As shown in FIG. 2, malicious process detector 214 is stored in a memory 204. Memory 204 further stores a file directory 210, one or more processes 218 and a process 220. Processes 218 may each be an instance of a computer program being executed by processor(s) 102 (as shown in FIG. 1). The computer program may comprise an application program (or "application"), a system program, or other computer program being executed by processor(s) 102. Process 220 may be an instance of a malicious application configured to perform malicious operations, such as ransomware-related operations. For example, process 220 may be configured to encrypt files stored on computing device 102, thereby rendering the files inaccessible by the user of computing device 102 until a ransom is paid to decrypt the files, although the embodiments described herein are not so limited. Memory 204, malicious process detector 214 and directory 210 are examples of memory 104, malicious process detector 114 and directory 110, as respectively described above with reference to FIG. 1.

As further shown in FIG. 2, malicious process detector 214 comprises a decoy documents manager 202, an operation monitor 206, an operation analyzer 208, an updateable knowledge base 224 and a pattern learning module 222. Decoy documents manager 202 is configured to create one or more decoy files 216 in one or more of director(ies) 210, which may comprise one or more other file(s) 212. Director(ies) 210, decoy file(s) 216 and file(s) 212 are examples of director(ies) 110, decoy file(s) 116 and file(s) 112, as respectively described above with reference to FIG. 1.

Decoy file(s) 216 may possess attributes that cause decoy file(s) 216 to reside at the beginning and/or the end of a file list when directory 210 is sorted thereby and/or traversed by a program (e.g., a malicious process, such as process 220) that reads directory 210. Examples of such attribute(s) include, but are not limited to, the file name, the file size, the creation date, the modification date, file type, authors, etc. For example, before creating decoy file(s) 216, decoy documents manager 202 may initially read directory 210 and determine attributes of file(s) 212. Thereafter, decoy document manager 202 may specify the attributes for decoy file(s) 216 based on the determined attributes of file(s) 212 such that decoy file(s) 216 reside at the beginning and/or the end of the file list when directory 210 is sorted and/or traversed by a malicious process (e.g., process 220).

For example, decoy documents manager 202 may determine that the first file of file(s) 212, when directory 210 is sorted alphabetically by file name, is "Family Vacation.jpeg." To ensure that decoy file(s) 216 appear before this file, decoy documents manager 202 may designate the file names of decoy file(s) 216 to start with a letter before 'F', a number, or a special character (e.g., !, @, #, S, %, ^, &, etc.). Decoy documents manager 202 may also determine that the last file of file(s) 212, when directory 210 is sorted alphabetically by file name, is "Maui.jpeg." To ensure that decoy file(s) 216 appear after this file, decoy documents manager 202 may designate the file names of decoy file(s) 216 to start with the letter 'N' or some other letter that comes after the letter 'M'. Decoy documents manager 202 may create decoy file(s) 216 that reside both at the beginning and the end of the file list to ensure that decoy file(s) 216 are accessed regardless of whether a malicious process (e.g., process 220) accesses the files (e.g., file(s) 212 and decoy file(s) 216) in directory 210 by file name in ascending or descending order.

In another example, decoy documents manager 202 may determine that the first file of file(s) 212, when directory 210 is sorted chronologically by creation and/or modification date, is "Jan. 29, 2014." To ensure that decoy file(s) 216 appear before this file, decoy documents manager 202 may designate the creation and/or modification date of decoy file(s) 216 to have a creation and/or modification date before this date. Decoy documents manager 202 may also determine that the last file of file(s) 212, when directory 210 is sorted chronologically by creation and/or modification date, is "Dec. 1, 2017." To ensure that decoy file(s) appear after this file, decoy documents manager 202 may designate the creation and/or modification date of decoy file(s) 216 to have a creation and/or modification date after this date. Decoy documents manager 202 may create decoy file(s) 216 that reside both at the beginning and the end of the file list to ensure that decoy file(s) 216 are accessed regardless of whether a malicious process (e.g., process 220) accesses the files (e.g., file(s) 212 and decoy file(s) 216) in directory 210 by creation and/or modification date in ascending or descending order.

In yet another example, decoy documents manager 202 may determine that the first file of file(s) 212, when directory 210 is sorted by file size, is 110 KB. To ensure that decoy file(s) 216 appear before this file, decoy documents manager 202 may specify the file size of decoy file(s) 210 to be less than 110 KB, or alternatively, create a decoy file that has a file size less than 110 KB. Decoy documents manager 202 may also determine that the last file of file(s) 212, when directory 210 is sorted by file size, is 12 MB. To ensure that decoy file(s) 216 appear after this file, decoy documents manager 202 may specify the file size of decoy file(s) 216 to more than 12 MB, or alternatively, create a decoy file that has a file size of more than 12 MB. Decoy documents manager 202 may create decoy file(s) 216 that reside both at the beginning and the end of the file list to ensure that decoy file(s) 216 are accessed regardless of whether a malicious process (e.g., process 220) accesses the files (e.g., file(s) 212 and decoy file(s) 216) in directory 210 by file size in ascending or descending order.

It is noted that the attributes described above are purely exemplary, and that any attribute of decoy file(s) 216 provided by the file system maintaining directory 210 (e.g., file system 108) may be modified, including, but not limited to the content of the decoy file(s) 216, or one or more other properties of decoy file(s) 216, to ensure a desired placement of such decoy file(s) 216 at the beginning or end of a file list used for sorting and/or traversal.

Decoy documents manager 202 may be further configured to periodically modify attribute(s) of decoy file(s) 216 and/or create additional decoy files to take into account additional file(s) 212 that have been modified and/or added to director(ies) 212 over time. This is also performed to emulate a typical file system and to prevent malicious process 210 from learning which files stored in director(ies) 210 are decoy file(s) 216 and skipping such files when carrying out encryption operations. Decoy documents manager 202 provides a list of decoy file(s) 216 and their associated attributes to updateable knowledge base 224, which is described below.

Operation monitor 206 is configured to monitor decoy file(s) 216 for one or more file access operations directed to decoy file(s) 216. Examples of file access operations include, but are not limited to, an open operation, a read operation, a write operation, a copy operation, etc. In certain implementations, file access operations are issued by a process via procedure calls. In accordance with such implementations, operation monitor 206 may use hooking techniques to hook procedure calls directed to decoy file(s) 216. Examples of procedure calls that may be hooked include, but are not limited to, an NtOpenFile procedure call, an NtReadFile procedure call, an NtWriteFile procedure call, an NtCreateFile procedure call etc., each of which are procedure calls used in a Microsoft Windows®-based operating system. It is noted that the foregoing is just one technique for detecting file access operations, and that other detection techniques may be used, including, but not limiting to, using a kernel-mode component such as a file system filter driver (e.g., in a Microsoft Windows®-based environment) to detect file access operations.

In accordance with an embodiment, only decoy file(s) 216 are monitored by operation monitor 206 to reduce the computing overhead of the computing device on which malicious process detector 214 is executing, although the embodiments described herein are not so limited. For example, as described below, file(s) 212 may also be monitored by operation monitor 206.

Upon detecting file access operation(s) issued to decoy file(s) 216, operation monitor 206 may send a request to operation analyzer 208 that indicates the file access operation(s) issued to decoy file(s) 216. Operation analyzer 208 may determine whether the process that issued the file access operation(s) is a malicious process (e.g., process 220). For example, operation analyzer 208 may access updateable knowledge base 224 Updateable knowledge base 224 may comprise a data store (e.g., a database) that stores one or more decoy file identifiers that each represent a particular decoy file of decoy file(s) 216. The identifier may be the file name of the decoy file, the directory path of the decoy file, a tag representative of the decoy file and/or the like. The identifier may be provided by decoy documents manager 202 upon creation of a decoy file and/or an update to the file name, directory path, tag, etc., of the decoy file.

Updateable knowledge base 224 may further maintain a set of rules (e.g., predetermined rules) that indicate which types of file access operations to decoy file(s) 216 (or patterns thereof) are illegal (i.e., issued from a malicious process) or legal (i.e., issued from a non-malicious process). Operation analyzer 208 may analyze the file access operation(s) to identify a pattern associated with the file access operation(s). Operation analyzer 208 may apply the rule(s) to the identified pattern to determine whether the file access operation(s) originate from a non-malicious process or a malicious process. For example, a rule may specify that a particular file access operation followed by another particular file access operation is considered to be an illegal file access pattern. Thus, if the identified pattern conforms to this rule, operation analyzer 208 may determine the file access operation(s) detected by operation monitor 206 originated from a malicious process (e.g., process 220) and may provide an indication to operation monitor 206 that indicates that the file access operation(s) originate from a malicious process. If the identified pattern does not conform to this rule (or any other rule that indicates an illegal file access pattern), operation analyzer 208 may determine that the file access operation(s) detected by operation monitor 206 originated from a non-malicious process and may provide an indication to operation monitor 206 that indicates that the file access operation(s) do not originate from a malicious process. The rule(s) maintained in updateable knowledge base 224 may be periodically updated with new patterns (e.g., via a software update).

An example of a rule that specifies an illegal pattern may be a read operation that reads a portion of data from a file, a write operation that rewrites that portion with an encrypted version of that data, and repeating these operations until all the portions of data from the file are encrypted. Another example be a read operation that reads the whole file for data included therein, a create operation that creates a new file (having the same file name) that contains an encrypted version of that data, and a delete operation that deletes the original file.

Updateable knowledge base 224 may also store predetermined illegal pattern(s), and operation analyzer 208 may compare the file access operation(s) detected by operation monitor 206 to the file access operation(s) included in the stored, predetermined pattern(s) to determine whether the file access operation(s) match any of the pattern(s) stored therein. If operation analyzer 208 finds a match, operation analyzer 208 provides an indication to operation monitor 206 that indicates that the file access operation(s) originate from a malicious process. If operation analyzer 208 does not find a match, operation analyzer 208 provides an indication to operation monitor 206 that indicates that the file access operation(s) do not originate from a malicious process. The patterns stored in updateable knowledge base 224 may be periodically updated with new patterns (e.g., via a software update).

In addition to or in lieu of analyzing file access operation(s) using rule(s) and/or predetermined, stored pattern(s), malicious process detector 212 may utilize a machine-learning based technique to determine whether file access operations(s) originate from a non-malicious process or a malicious process. For example, pattern learning module 222 may train a machine-learning-based algorithm on observed file access patterns to file(s) 212. For instance, pattern learning module 222 may continuously receive information from operation monitor 206 that specifies file access operation(s) directed to file(s) 212 and analyze file access operation(s) that are directed to file(s) 212 over time (e.g., a day, a week, a month, a year, etc.). Generally, file access operation(s) directed to file(s) 212 are initiated by non-malicious processes, which initiate such file access operation(s) based on user-driven input. Thus, the machine-learning based algorithm may learn what constitutes legal file access pattern(s) based on the historical file access operations to file(s) 212. File access operation(s) (or pattern(s) thereof) to decoy file(s) 216 that deviate from the model (i.e., anomalous operation(s)/pattern(s)) may be designated as being illegal operations (i.e., such file access operation(s) are determined to originate from a malicious process).

As described above, operation analyzer 208 may analyze the file access operation(s) to decoy file(s) 216 identify a pattern associated with the file access operation(s). Operation analyzer 208 may provide the identified pattern as an input of the machine-learning-based algorithm of pattern learning module 222. The machine-learning-based algorithm may determine a probability that the identified pattern originates from a non-malicious process. The probability may be compared to a threshold. If the probability exceeds the threshold, the file access operation(s) are determined to be legal operations (i.e., such operation(s) are determined to originate from a non-malicious process), and the machine-learning-based algorithm of pattern learning module 222 outputs an indicator that indicates that the operation(s) to decoy file(s) 216 are not issued from a malicious process (e.g., process 220). The indicator is provided to operation monitor 206. If the probability does not exceed the threshold, the file access operation(s) are determined to be illegal operations (i.e., such operation(s) are determined to originate from a malicious process, and the machine-learning-based algorithm of pattern learning module 222 outputs an indicator that indicates that the operation(s) to decoy file(s) 216 are issued from a malicious process (e.g., process 220). Pattern learning module 222 may also update knowledge base 224 with the pattern identified to be originated form a malicious process and/or one or more rules specifying the identified pattern(s).

In accordance with an embodiment, the contents of updateable knowledge base (e.g., the decoy file identifier(s), the pattern(s), rule(s), and model) may be encrypted, thereby preventing a malicious process from tampering with the contents stored thereby.

Upon receiving an indication that the file access operation(s) issued to decoy file(s) 216 is from a malicious process (e.g., process 220), operation monitor 206 may perform one or more operations to neutralize the malicious process. For example, operation monitor 206 may cause the operating system (e.g., operating system 106) to terminate the malicious process, suspend the malicious process, perform a backup of file(s) 212, check the integrity of file(s) 212, record in an event log an event that indicates that a malicious process performed file access operation(s) to file(s) 212 to, prompt a user of the computing device (e.g., computing device 100) to indicate an operation to perform, and/or activate an anti-virus program or other security mechanism that is configured to neutralize the malicious process.

Figure 3:
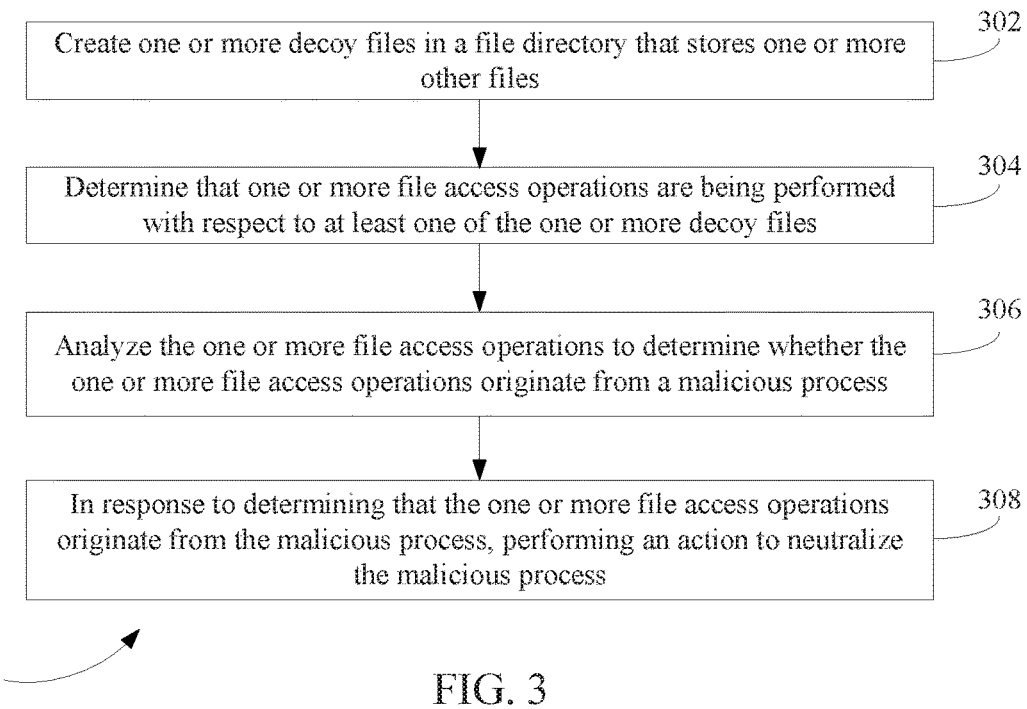
FIG. 3 depicts a flowchart of an example method for detecting and neutralizing a malicious process in accordance with an example embodiment.
Figure 4:
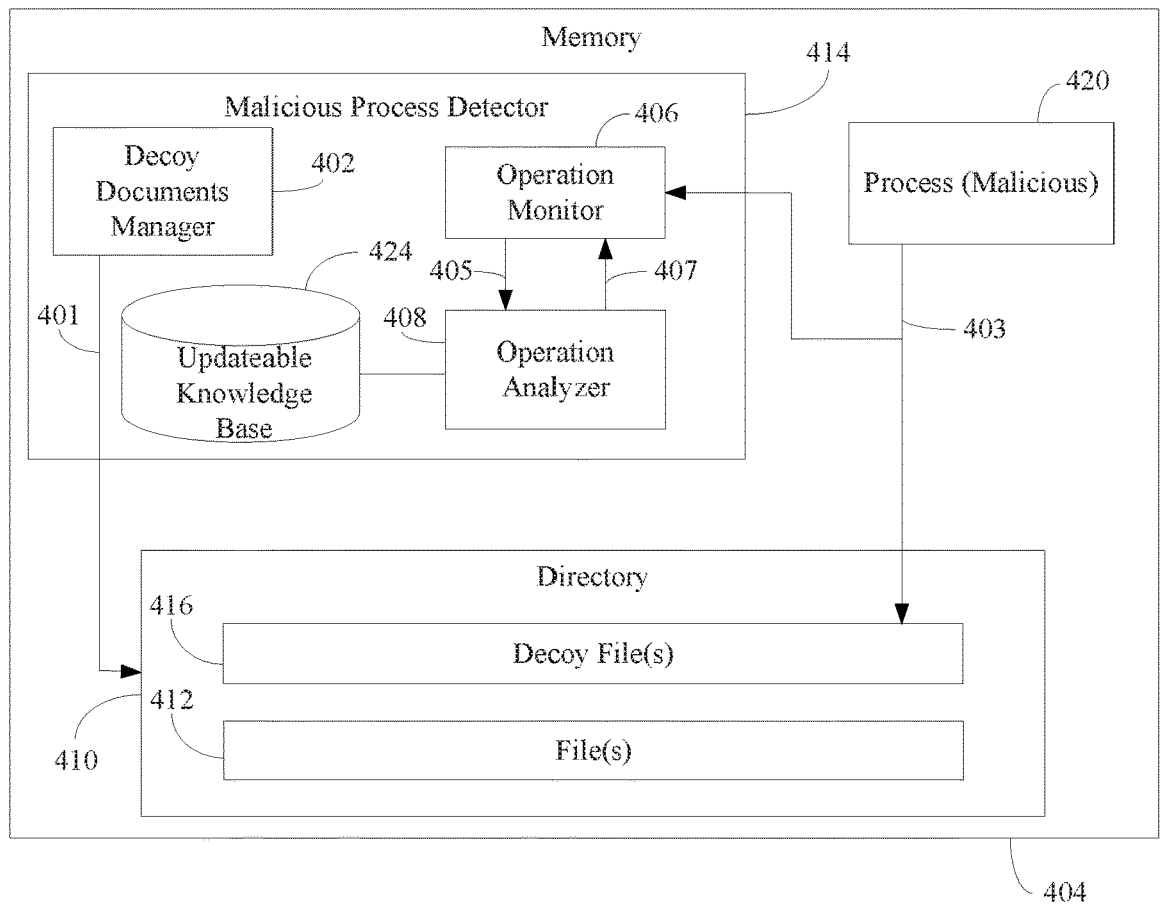
FIG. 4 depicts a block diagram of a malicious process detector stored in a memory in accordance with another embodiment.

Accordingly, malicious process detector 214 may be configured to detect and/or neutralize a malicious process in many ways. For example, FIG. 3 depicts a flowchart 300 of an example method for detecting and neutralizing a malicious process, according to an example embodiment. Malicious process detector 214 shown in FIG. 2 may operate according to flowchart 300. For illustrative purposes, flowchart 300 is described with reference to FIG. 4. FIG. 4 shows a block diagram 400 of main memory 404 of a computing device (e.g., computing device 100, as shown in FIG. 1), according to an embodiment. Memory 404 is an example of memory 204. Accordingly, decoy documents manager 402, operating monitor 406, operation analyzer 408, updateable knowledge base 424, directory 410, file(s) 412, decoy file(s) 416, and process 420 are examples of decoy documents manager 202, operating monitor 206, operation analyzer 408, updateable knowledge base 224, directory 210, file(s) 212, decoy file(s) 216, and process 220, as shown in FIG. 2. Further structural and operational embodiments will be apparent to persons skilled in the relevant art(s) based on the discussion regarding flowchart 300. Flowchart 300 and main memory 404 are described as follows.

Flowchart 300 begins with step 302. At step 302, one or more decoy files in a file directory that stores one or more other files is created. For example, as shown in FIG. 4, decoy documents manager 402 creates decoy file(s) 416 in directory 410, which stores file(s) 412. In accordance with an embodiment, decoy documents manager 402 may issue a procedure call 401 to the operating system (e.g., operating system 106) that causes decoy file(s) 416 to be created. The procedure call may specify one or more attributes for the decoy file(s) 416 that are created (e.g., the file name, a path to directory 410 in which decoy file(s) 416 are to be created, file access privileges, etc.). An example of such a procedure call is an NtCreateFile procedure call etc., which is a procedure call used in a Microsoft Windows®-based operating system.

In accordance with one or more embodiments, one or more attributes of the one or more decoy are periodically modified such that a sorting operation performed on files stored in the directory causes the one or more decoy files to be listed before the other one or more files in a list generated by the sorting operation. For example, with reference to FIG. 4, decoy documents manager 402 may periodically modify attribute(s) of decoy file(s) 416.

In accordance with one or more embodiments, the attribute(s) comprise at least one of a file name, a file size, a creation date, or a modification date.

At step 304, one or more file access operations are determined to be performed with respect to at least one of the one or more decoy files. For example, with reference to FIG. 4, operation monitor 406 monitors decoy file(s) 416 to determine file access operation(s) 403 are being performed with respect thereto. In accordance with an embodiment, operation monitor 406 may use hooking techniques to hook procedure calls issued to decoy file(s) 216. Examples of procedure calls that may be hooked include, but are not limited to, an NtOpenFile procedure call, an NtReadFile procedure call, an NtWriteFile procedure call, each of which are procedure calls used in a Microsoft Windows®-based operating system.

At step 306, the one or more file access operations are analyzed to determine whether the one or more file access operations originate from a malicious process. For example, with reference to FIG. 3, operation monitor 406 may send a request 405 to operation analyzer 408 that includes information specifying file access operation(s) 403 that were detected by operation monitor 406. Operation analyzer 408 may analyze the file access operation(s) to determine whether file access operation(s) 403 originate from a malicious process (e.g., process 420).

In accordance with one or more embodiments, a pattern associated with the one or more file access operations that are being performed with respect to the one or more decoy files are identified and one or more rules are applied to the pattern to determine whether the one or more file access operations originate from the malicious process. For example, with reference to FIG. 4, operation analyzer 408 may identify a pattern associated with file access operation(s) 403. Operation analyzer 408 may apple rule(s) that are maintained by updateable knowledge base 424 determine whether operation(s) 403 originate from the malicious process (e.g., process 420). In response to determining that operation(s) 403 originate from the malicious process, operation analyzer 408 provides an indicator 407 that indicates that operation(s) 403 originate from a malicious process (i.e., indicator 407 indicates the process from which file access operation(s) 403 originate (i.e., process 420) is a malicious process.

In accordance with one or more embodiments, the pattern associated with the one or more file access operation(s) comprises a read operation to the decoy file or to a portion thereof and a write operation to the same decoy file or the same portion thereof.

In accordance with one or more embodiments, the file access operation(s) are analyzed in accordance with a machine-learning-based algorithm. Additional details regarding the foregoing technique are described below with reference to FIGS. 5 and 6.

At step 308, in response to determining that the one or more file access operations originate from the malicious process, an action is performed to neutralize the malicious process. For example, with reference to FIG. 4, in response to receiving indicator 407, operation monitor 406 performs an action to neutralize the malicious process.

In accordance with an embodiment, comprises one or more of terminating the malicious process, suspending the malicious process, performing backup of the one or more other files stores in the file directory, checking an integrity of the one or more other files, activating an anti-virus program, recording in an event log an event that indicates that the malicious process performed the one or more file access operations to the one or more decoy files, or prompting a user of the computing device to indicate an operation to perform. In accordance with such an embodiment, operation monitor 206 may send a command to the operating system (e.g., operating system 106) that causes one or more of these operations to be performed.

Figure 5:
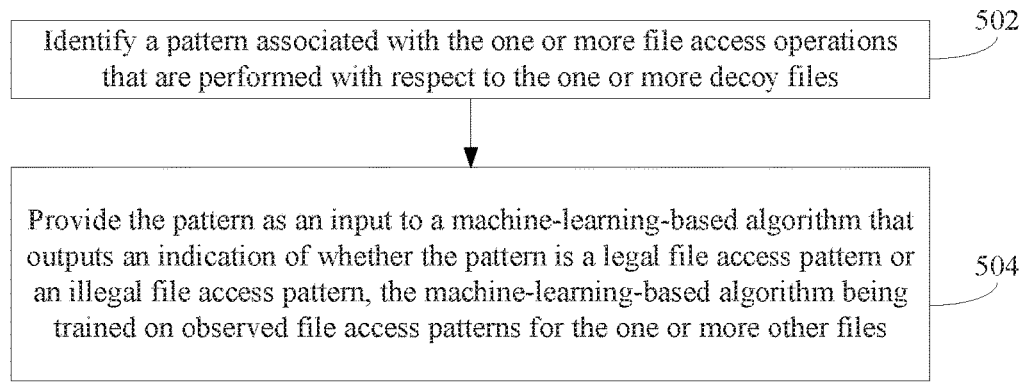
FIG. 5 depicts a flowchart of an example method for analyzing file access operation(s) to determine whether such operation(s) originate from a malicious process in accordance with an embodiment.
Figure 6:
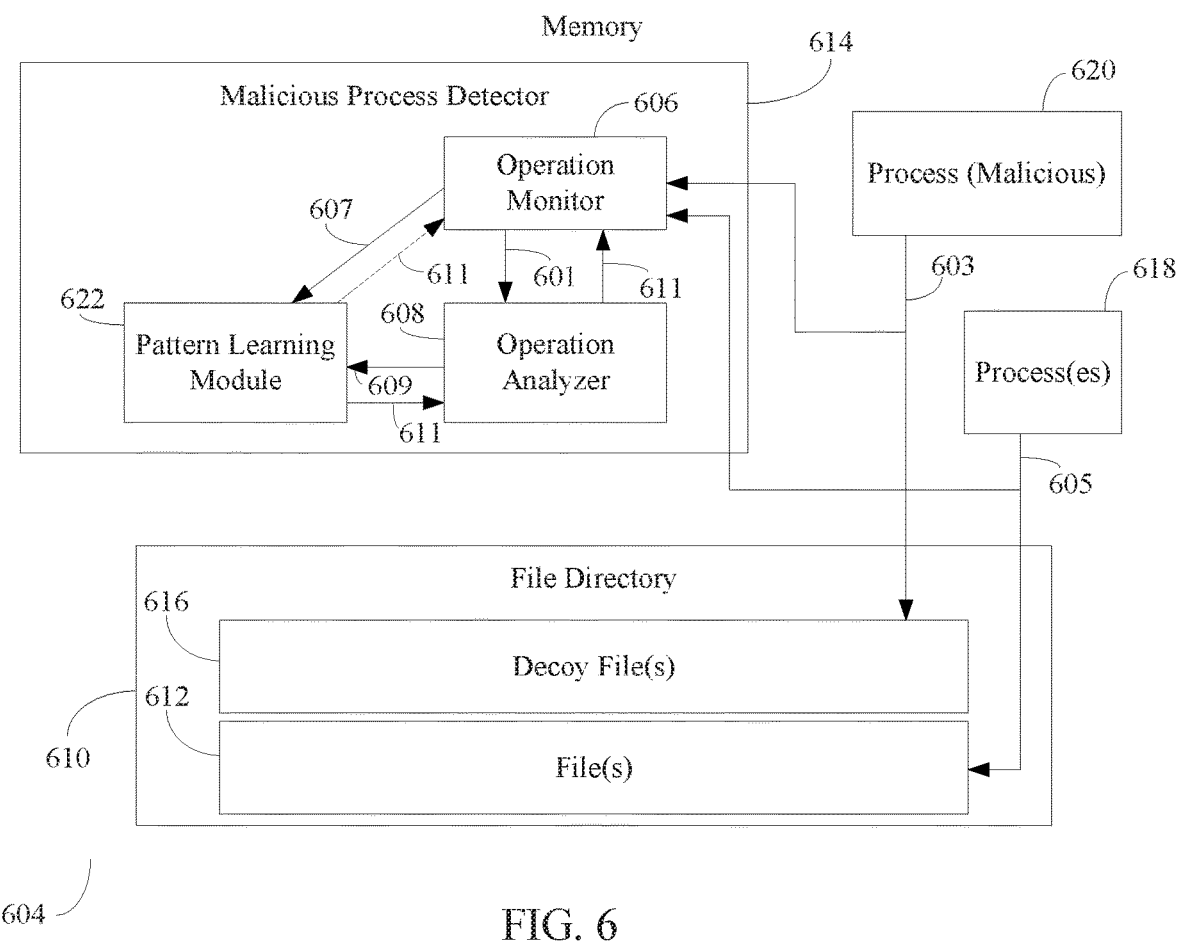
FIG. 6 depicts a block diagram of a malicious process detector stored in a memory in accordance with another embodiment.

FIG. 5 depicts a flowchart 500 of an example method for analyzing file access operation(s) to determine whether such operation(s) originate from a malicious process, according to an example embodiment. Malicious process detector 214 shown in FIG. 2 may operate according to flowchart 500. For illustrative purposes, flowchart 500 is described with reference to FIG. 6. FIG. 6 shows a block diagram 600 of main memory 604 of a computing device (e.g., computing device 100, as shown in FIG. 1), according to an embodiment. Memory 604 is an example of memory 204. Accordingly, operation monitor 606, operation analyzer 608, pattern learning module 622, directory 610, file(s) 612, decoy file(s) 616, process(es) 618, and process 620 are examples of operation monitor 206, operation analyzer 208, pattern learning module 222, directory 210, file(s) 212, decoy file(s) 216, process(es) 218, and process 220, as shown in FIG. 2. Further structural and operational embodiments will be apparent to persons skilled in the relevant art(s) based on the discussion regarding flowchart 500. Flowchart 500 and main memory 604 are described as follows.

Flowchart 500 begins with step 502. At step 502, a pattern associated with the one or more file access operations that are performed with respect to the one or more decoy files is identified. For example, with reference to FIG. 6, operation monitor 606 may send a request 601 to operation analyzer 608 that includes information specifying file access operation(s) 603 to decoy file(s) 616 that were detected by operation monitor 606. Operation analyzer 608 may identify a pattern associated with file access operation(s) 603.

At step 504, the pattern is provided as an input to a machine-learning-based algorithm that outputs an indication of whether the pattern is a legal file access pattern or an illegal file access pattern, the machine-learning-based algorithm being trained on observed file access patterns for the one or more other files. For example, with reference to FIG. 6, operation monitor 606 may send a request 607 to pattern learning module 622 that includes information specifying file access operation(s) 605 to file(s) 612 that were detected by operation monitor 606. Pattern learning module 622 may train a machine-learning-based algorithm on file access operation(s) 605. Operation analyzer 408 may provide an input 609 to pattern learning module 622 that specifies the identified pattern. The machine-learning based algorithm of pattern learning module 622 may output an indication 611 to operation analyzer 608 that indicates whether the pattern is a legal file access pattern or an illegal file access pattern. Alternatively, pattern learning module 622 may provide indicator 611 to operation monitor 606.

In accordance with one or more embodiments, the machine-learning based algorithm outputs a probability that the pattern is a legal file access pattern and the probability is compared to a threshold to determine whether the pattern is a legal file access pattern.

IV. Example Computer System Implementation

Figure 7:
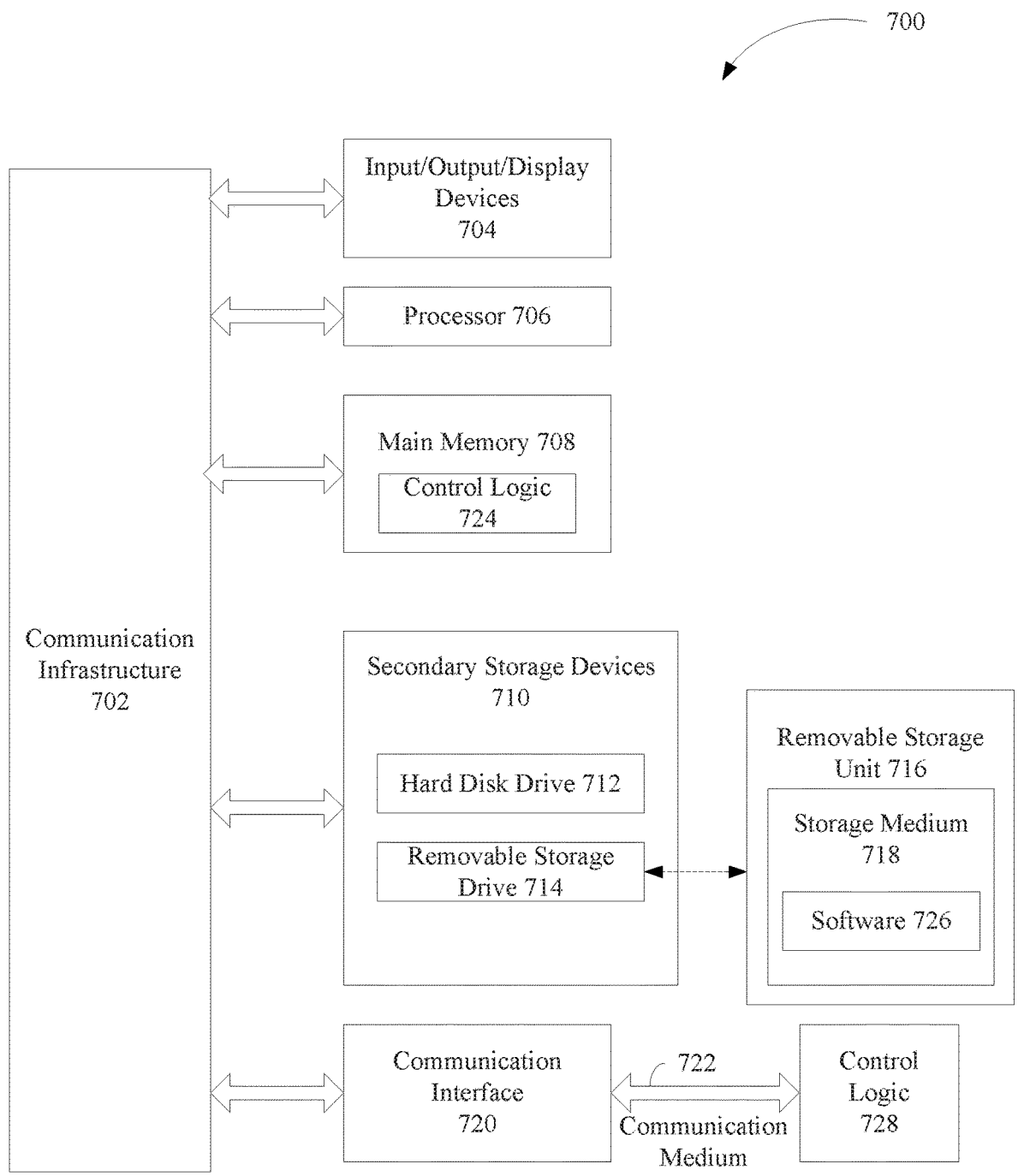
FIG. 7 depicts a block diagram of a computer system that may be configured to perform techniques disclosed herein.

The embodiments described herein, including systems, methods/processes, and/or apparatuses, may be implemented using well known processing devices, telephones (land line based telephones, conference phone terminals, smart phones and/or mobile phones), interactive television, servers, and/or, computers, such as a computer 700 shown in FIG. 7. It should be noted that computer 700 may represent computing devices linked to, processing devices, traditional computers, and/or the like in one or more embodiments. For example, computing device 100 of FIG. 1, memory 204, memory 404, memory 604, and any of the sub-systems, components, and/or models respectively contained therein and/or associated therewith, may be implemented using one or more computers 700.

Computer 700 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 700 may be any type of computer, including a desktop computer, a server, etc.

Computer 700 includes one or more processors (also called central processing units, or CPUs), such as a processor 706. Processor 706 is connected to a communication infrastructure 702, such as a communication bus. In some embodiments, processor 706 can simultaneously operate multiple computing threads, and in some embodiments, processor 706 may comprise one or more processors.

Computer 700 also includes a primary or main memory 708, such as random access memory (RAM). Main memory 908 has stored therein control logic 724 (computer software), and data.

Computer 700 also includes one or more secondary storage devices 710. Secondary storage devices 710 include, for example, a hard disk drive 712 and/or a removable storage device or drive 714, as well as other types of storage devices, such as memory cards and memory sticks. For instance, computer 700 may include an industry standard interface, such a universal serial bus (USB) interface for interfacing with devices such as a memory stick. Removable storage drive 714 represents a floppy disk drive, a magnetic tape drive, a compact disk drive, an optical storage device, tape backup, etc.

Removable storage drive 714 interacts with a removable storage unit 716. Removable storage unit 716 includes a computer useable or readable storage medium 718 having stored therein computer software 726 (control logic) and/or data. Removable storage unit 716 represents a floppy disk, magnetic tape, compact disk, DVD, optical storage disk, or any other computer data storage device. Removable storage drive 714 reads from and/or writes to removable storage unit 716 in a well-known manner.

Computer 700 also includes input/output/display devices 704, such as touchscreens, LED and LCD displays, monitors, keyboards, pointing devices, etc.

Computer 700 further includes a communication or network interface 720. Communication interface 720 enables computer 700 to communicate with remote devices. For example, communication interface 720 allows computer 700 to communicate over communication networks or mediums 722 (representing a form of a computer useable or readable medium), such as LANs, WANs, the Internet, etc. Network interface 720 may interface with remote sites or networks via wired or wireless connections.

Control logic 728 may be transmitted to and from computer 900 via the communication medium 722.

Any apparatus or manufacture comprising a computer useable or readable medium having control logic (software) stored therein is referred to herein as a computer program product or program storage device. This includes, but is not limited to, computer 700, main memory 708, secondary storage devices 710, and removable storage unit 716. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media and signals transmitted over wired media. Embodiments are also directed to such communication media.

The techniques and embodiments described herein may be implemented as, or in, various types of devices. For instance, embodiments may be included in mobile devices such as laptop computers, handheld devices such as mobile phones (e.g., cellular and smart phones), handheld computers, and further types of mobile devices, desktop and/or server computers. A device, as defined herein, is a machine or manufacture as defined by 35 U.S.C. § 101. Devices may include digital circuits, analog circuits, or a combination thereof. Devices may include one or more processor circuits (e.g., central processing units (CPUs) (e.g., processor 906 of FIG. 9), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for malware prevention performed by a computing device, comprising:
   creating one or more decoy files in a file directory that stores one or more other non- decoy files before the file directory is read by a malicious process;
   determining that one or more file access operations are being performed with respect to at least one of the one or more decoy files;

analyzing the one or more file access operations to determine whether the one or more file access operations originate from the malicious process; and in response to determining that the one or more file access operations originate from the malicious process, performing an action to neutralize the malicious process.

2. The method of claim 1, wherein the performing the action comprises at least one of:
terminating the malicious process;
suspending the malicious process;
performing a backup of the one or more other non-decoy files stored in the file directory;
checking an integrity of the one or more other non-decoy files;
activating an anti-virus program;
recording in an event log an event that indicates that the malicious process performed the one or more file access operations to the one or more decoy files; or
prompting a user of the computing device to indicate an operation to perform.

3. The method of claim 1, further comprising:
periodically modifying one or more attributes of the one or more decoy files such that a sorting operation performed on the files stored in the directory causes the one or more decoy files to be listed before the other one or more non-decoy files in a list generated by the sorting operation.

4. The method of claim 3, wherein the one or more attributes comprise at least one of:
a file name;
a file size;
a creation date;
a modification date;
a file type; or
file content.

5. The method of claim 1, wherein the analyzing comprises:
identifying a pattern associated with the one or more file access operations that are performed with respect to the one or more decoy files; and
providing the pattern as an input to a machine-learning-based algorithm that outputs an indication of whether the pattern is a legal file access pattern or an illegal file access pattern, the machine-learning-based algorithm being trained on observed file access patterns for the one or more other non-decoy files.

6. The method of claim 5, wherein the machine-learning based algorithm outputs a probability that the pattern is a legal file access pattern and the analyzing further comprises:
comparing the probability to a threshold.

7. The method of claim 1, wherein the analyzing comprises:
identifying a pattern associated with the one or more file access operations that are performed with respect to the one or more decoy files; and
applying one or more rules to the pattern to determine whether the one or more file access operations originate from the malicious process.

8. The method of claim 7, wherein the pattern associated with the one or more file access operations comprises a read operation to the decoy file or to a portion thereof and a write operation to the same decoy file or the same portion thereof.

9. A system, comprising:
one or more processors; and
a memory coupled to the one or more processors, the memory storing instructions, which, when executed by the one or more processors, cause the one or more processors to perform operations, the operations comprising:
creating one or more decoy files in a file directory that stores one or more other non-decoy files before the file directory is read by a malicious process;
determining that one or more file access operations are being performed with respect to at least one of the one or more decoy files;
analyzing the one or more file access operations to determine whether the one or more file access operations originate from the malicious process; and
in response to determining that the one or more file access operations originate from the malicious process, performing an action to neutralize the malicious process.

10. The system of claim 9, wherein the performing the action comprises at least one of:
terminating the malicious process;
suspending the malicious process;
performing a backup of the one or more other non-decoy files stored in the file directory;
checking an integrity of the one or more other non-decoy files;
activating an anti-virus program;
recording in an event log an event that indicates that the malicious process performed the one or more file access operations to the one or more decoy files; or
prompting a user of the computing device to indicate an operation to perform.

11. The system of claim 9, the operations further comprising:
periodically modifying one or more attributes of the one or more decoy files such that a sorting operation performed on the files stored in the directory causes the one or more decoy files to be listed before the other one or more non-decoy files in a list generated by the sorting operation.

12. The system of claim 11, wherein the one or more attributes comprise at least one of:
a file name;
a file size;
a creation date;
a modification date;
a file type; or
file content.

13. The system of claim 9, wherein the analyzing comprises:
identifying a pattern associated with the one or more file access operations that are performed with respect to the one or more decoy files; and
providing the pattern as an input to a machine-learning-based algorithm that outputs an indication of whether the pattern is a legal file access pattern or an illegal file access pattern, the machine-learning-based algorithm being trained on observed file access patterns for the one or more other non-decoy files.

14. The system of claim 13, wherein the machine-learning based algorithm outputs a probability that the pattern is a legal file access pattern and the analyzing further comprises:
comparing the probability to a threshold.

15. The system of claim 9, wherein the analyzing comprises:
identifying a pattern associated with the one or more file access operations that are performed with respect to the one or more decoy files; and applying one or more rules to the pattern to determine whether the one or more file access operations originate from the malicious process.

16. The system of claim 15, wherein the pattern associated with the one or more file access operations comprises a read operation to the decoy file or to a portion thereof and a write operation to the same decoy file or the same portion thereof.

17. A computer-readable storage medium having program instructions recorded thereon that, when executed by a processing device, perform a method for detecting a malicious process, the method comprising:
- creating one or more decoy files in a file directory that stores one or more other non-decoy files before the file directory is read by the malicious process;
- determining that one or more file access operations are being performed with respect to at least one of the one or more decoy files;
- analyzing the one or more file access operations to determine whether the one or more file access operations originate from the malicious process; and
- in response to determining that the one or more file access operations originate from the malicious process, performing an action to neutralize the malicious process.

18. The computer-readable storage medium of claim 17, wherein the performing the action comprises at least one of:
- terminating the malicious process;
- suspending the malicious process;
- performing a backup of the one or more other non-decoy files stored in the file directory;
- checking an integrity of the one or more other non-decoy files;
- activating an anti-virus program;
- recording in an event log an event that indicates that the malicious process performed the one or more file access operations to the one or more decoy files; or
- prompting a user of the computing device to indicate an operation to perform.

19. The computer-readable storage medium of claim 17, the method further comprising:
- periodically modifying one or more attributes of each of the one or more decoy files such that a sorting operation performed on the files stored in the directory causes the one or more decoy files to be listed before the other one or more non-decoy files in a list generated by the sorting process.

20. The computer-readable storage medium of claim 19, wherein the one or more attributes comprise at least one of a file name, a file size, a creation date, a modification date, a file type, or file content.

* * * * *